United States Patent
Oechsle (12)

(10) Patent No.: US 10,967,332 B2
(45) Date of Patent: Apr. 6, 2021

(54) FILTER DEVICE

(71) Applicant: Pall Corporation, Port Washington, NY (US)

(72) Inventor: Dietmar Oechsle, Schwäbisch Gmünd (DE)

(73) Assignee: Pall Corporation, Port Washington, NY (US)

( * ) Notice: Subject to any disclaimer, the term of this patent is extended or adjusted under 35 U.S.C. 154(b) by 154 days.

(21) Appl. No.: 16/004,596

(22) Filed: Jun. 11, 2018

(65) Prior Publication Data

US 2018/0290107 A1 Oct. 11, 2018

Related U.S. Application Data

(63) Continuation of application No. PCT/EP2016/082593, filed on Dec. 23, 2016.

(30) Foreign Application Priority Data

Dec. 23, 2015 (DE) .......................... 102015122727.4

(51) Int. Cl.
*B01D 69/08* (2006.01)
*B01D 69/14* (2006.01)
*B01D 71/58* (2006.01)

(52) U.S. Cl.
CPC .......... *B01D 69/087* (2013.01); *B01D 69/08* (2013.01); *B01D 69/147* (2013.01); *B01D 71/58* (2013.01); *B01D 2323/30* (2013.01); *B01D 2323/345* (2013.01); *B01D 2323/42* (2013.01); *B01D 2325/12* (2013.01); *B01D 2325/42* (2013.01)

(58) Field of Classification Search
None
See application file for complete search history.

(56) References Cited

U.S. PATENT DOCUMENTS 5,484,620 A 1/1996 Oechsle et al.
2005/0145579 A1* 7/2005 Drohmann ............. B01D 39/06
210/777

(Continued)

FOREIGN PATENT DOCUMENTS

AU 757835 B2 3/2003
CA 2 886 437 A1 5/2014

(Continued)

OTHER PUBLICATIONS

International Bureau, International Search Report in International Application No. PCT/EP2016/082593, dated Apr. 4, 2017.

(Continued)

*Primary Examiner* — David C Mellon
(74) *Attorney, Agent, or Firm* — Leydig Voit & Mayer

(57) ABSTRACT

The invention proceeds from a filter device which is provided for stabilising a liquid, having at least one filter unit, a membrane filter unit, which has at least one filter element and at least one integrated stabiliser.
It is proposed that the filter unit has at least one further integrated stabiliser.
It is proposed in a further aspect of the invention that the filter device comprises at least one first precursor which is provided for forming the filter element at least partially, and the same first precursor is provided for forming the stabiliser at least partially.

9 Claims, 4 Drawing Sheets

(56) References Cited

U.S. PATENT DOCUMENTS

Figure 1:
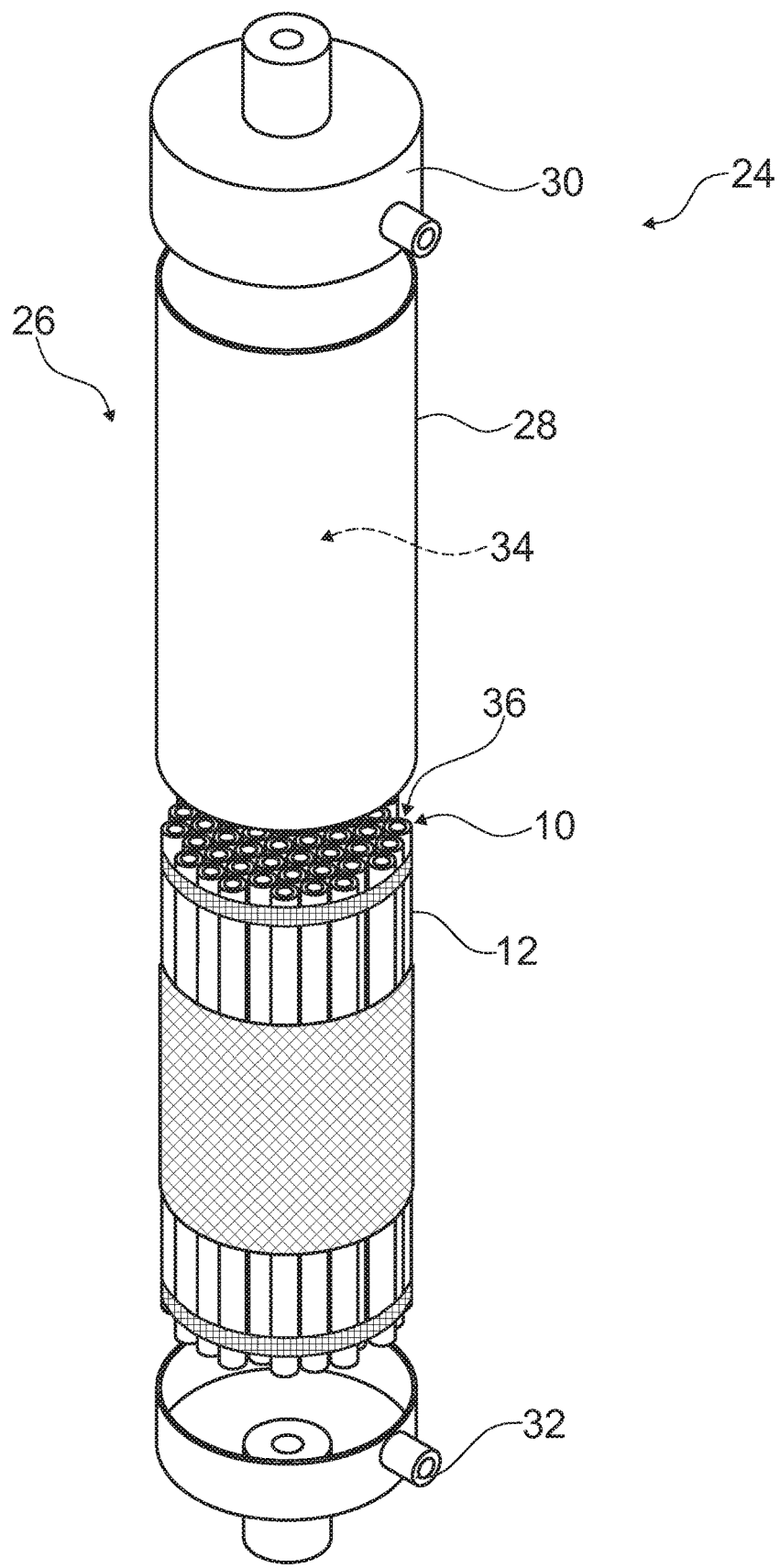

| | | | |
|---|---|---|---|
| 2008/0053891 A1 | 3/2008 | Koops et al. | |
| 2008/0135481 A1* | 6/2008 | Steiger | C08G 75/23 210/646 |
| 2009/0057225 A1* | 3/2009 | Krause | B01D 69/12 210/650 |
| 2010/0028505 A1 | 2/2010 | Katzke et al. | |
| 2011/0147308 A1* | 6/2011 | Johnston-Hall | B01D 61/147 210/650 |
| 2014/0326669 A1 | 11/2014 | Flieg et al. | |
| 2016/0145369 A1* | 5/2016 | Ohmukai | C08L 27/18 210/500.23 |
| 2016/0152932 A1 | 6/2016 | Herb et al. | |

FOREIGN PATENT DOCUMENTS

| | | |
|---|---|---|
| DE | 41 25 594 A1 | 6/1992 |
| DE | 10 2012 221 378 A1 | 5/2014 |
| DE | 10 2013 214 090 A1 | 1/2015 |
| EP | 0 806 474 A1 | 11/1997 |
| EP | 1 000 648 A1 | 5/2000 |
| EP | 1 627 941 A1 | 2/2006 |
| EP | 2 022 555 A1 | 2/2009 |
| JP | H1042852 A | 2/1998 |
| JP | 2002-515236 A | 5/2002 |
| JP | 2008-510083 A | 4/2008 |
| JP | 2008-284471 A | 11/2008 |
| JP | 2015-509826 A | 4/2015 |
| WO | WO 99/60090 A1 | 11/1999 |
| WO | WO 03/024587 A2 | 3/2003 |
| WO | WO 2006/135966 A1 | 12/2006 |
| WO | WO 2008/097154 A1 | 8/2008 |

OTHER PUBLICATIONS

International Bureau, English translation of International Preliminary Report on Patentability in International Application No. PCT/EP2016/082593, dated Jul. 5, 2018.

* cited by examiner

FILTER DEVICE

CROSS-REFERENCE TO RELATED APPLICATIONS

This patent application is a Continuation of International Patent Application No. PCT/EP2016/082593, filed Dec. 23, 2016, which claims the benefit of European Patent Application No. 10 2015 122 727.4, filed Dec. 23, 2015, which are each incorporated by reference.

PRIOR ART

The invention relates to a filter device, a method for producing a filter device, and a method of using a filter device.

A filter device is already known which is provided for stabilising a liquid, in particular beverages, and which comprises at least one filter unit, in particular a membrane filter unit, which has at least one filter element and at least one integrated stabiliser.

The object of the invention lies in particular in providing a device of the type in question that has improved properties in respect of the stabilisation of liquids.

Advantages of the Invention

The invention proceeds from a filter device which is provided for stabilising a liquid, in particular beverages, having at least one filter unit, in particular at least a plurality of filter units, in particular a membrane filter unit, which has at least one filter element and at least one integrated stabiliser.

It is proposed that the filter unit has at least one further integrated stabiliser. Due to the use of a plurality of stabilisers, more and in particular different substances dissolved in the liquid, which are responsible for turbidity in particular during storage and/or transport, can be separated from the liquid and in particular a number of stabilisation principles can be used, whereby a more efficient and purer stabilisation is provided. Compared to a filter device without stabiliser(s), up to 3% fewer substances that actively cause turbidity are observed in the liquid with use of a filter device having at least one stabiliser. More advantageously, compared to a filter device without stabiliser(s), up to 6% fewer substances that actively cause turbidity are observed in the liquid with use of a filter device having at least one stabiliser and at least one further stabiliser. Furthermore, the storage stability of the liquid can be improved. Compared to a filter device without stabiliser(s), a storage stability that is up to five times longer can be achieved, wherein initial turbidity occurs only after up to 6 months of storage. A combination of filtration and stabilisation is of interest in particular for the brewing and beverage industries, since investment in only one installation is required, whereby costs can be reduced. On the whole, a stabilisation of the liquid can thus be improved.

In this context, a "filter device" is understood to mean in particular at least a part, in particular a subassembly, of a filter, in particular a filter module, a filter assembly and/or a filter system. The filter device is preferably provided for stabilising beverages, such as drinking water, juices, and liquor, in particular beer, wine and/or whisky. The filter device could also be used alternatively or additionally for refinement, for wastewater treatment and/or in medical technology, in particular for haemodialysis. In particular, the filter device can also comprise the entire filter, in particular the entire filter module, the entire filter apparatus and/or the entire filter system. The filter device can advantageously comprise, in particular additionally, further parts and subassemblies, preferably in particular comprises these, preferably for forming the filter, the filter apparatus and/or the filter system.

In particular, "a stabilisation of a liquid" shall be understood to mean separation from a liquid of substances dissolved in the liquid, in particular organic substances or substances that actively cause turbidity, such as tannins, phenols, proteins, peptides and/or other impurities that cause turbidity, by means of liquid chromatography, in particular with use of different mechanical, chemical and/or physical separation principles.

A "filter unit" shall be understood in particular to mean a unit which is provided for receiving a liquid with a substance dissolved therein and for separating the substance from the liquid at least in part, in particular at least to a large extent, and particularly preferably completely, wherein the filter unit advantageously takes up the separated substance and allows the liquid to pass through. The filter unit is in particular provided for microfiltration, preferably ultrafiltration, and particularly preferably for nanofiltration. The filter unit in particular has at least one liquid channel for guiding the liquid. The filter element in particular has a structure which is partially permeable for a liquid, in particular a porous structure, which preferably forms a membrane at least partially. The filter element preferably delimits the liquid channel in at least one direction, in particular in a peripheral direction of the liquid channel. The filter unit is advantageously formed as a hollow fibre, the casing of which is preferably formed by the filter element. The filter unit particularly preferably forms a cross-flow filtration unit, in which in particular the liquid channel runs along the filter element, wherein in particular in an operating state a liquid running in the liquid channel passes through the filter element transversely to the liquid channel.

The filter element is in particular safe for food, and in particular components of the filter element, preferably precursors of the filter element and/or the components formed by these precursors, satisfy the Guideline of the Federal Environment Agency (UBA) for the Hygienic Assessment of Organic Materials in Contact with Drinking Water (KTW Guideline) and/or the Guideline of the U.S. Food and Drug Administration (FDA) for Contact with Food.

The filter element in particular has pores with a mean pore size of at least 0.004 µm, preferably of at least 0.01 µm, and particularly preferably 0.1 µm and/or in particular of at most 10 µm, preferably of at most 5 µm, and particularly preferably at most 2 µm. The filter element can be asymmetrical in particular, and more specifically can have a pore gradient, preferably along a wall diameter. The filter element can preferably have a carrier structure which is provided for carrying at least the inherent weight of the filter element, and in particular a separation structure which is provided at least for filtering and/or stabilising the liquid.

An "integrated stabiliser" shall be understood in particular to mean a stabiliser which is formed at least partially in one piece with the filter unit, more specifically in particular is connected in one piece to the filter element and/or forms the filter element at least partially.

The expression "at least partially in one piece" shall be understood in this context to mean in particular that at least one component part of at least one object, in particular the object itself, is formed in one piece with at least one component part of at least one further object, in particular is formed in one piece with the further object itself. The term "in one piece" shall be understood in this context to mean in particular connected at least by a substance-to-substance bond, for example by a welding process, an adhesive process, an injection moulding process, and/or another process appearing expedient to a person skilled in the art. The term "in one piece" shall advantageously also be understood to mean "in one part". The term "in one part" shall be understood in particular to mean formed in a single piece. This is preferably a piece produced from an individual blank, a mass and/or a casting, preferably in an injection moulding method, in particular a one-component and/or multi-component injection moulding method, and particularly preferably in a spinning method, in particular a wet spinning method, such as reactive spinning, in which in particular in a phase inversion process the filter unit is produced with integrated stabilisers.

The term "a stabiliser" shall be understood in particular to mean a substance which is provided for advantageously selectively separating and in particular taking up from the liquid at least one substance dissolved in the liquid by at least one preferably chemical separation principle, preferably by ion exchange and/or by adsorption.

The stabiliser and the further stabiliser are in particular different from one another and differ from one another in particular at least in part by a separation principle and/or a substance, in particular a precursor, forming the particular stabiliser.

In a further aspect of the invention it is proposed that the filter device comprises at least one first precursor which is provided to form the filter element at least partially, and the same first precursor is provided to form the stabiliser at least partially. An efficient integration of the stabiliser can be provided as a result, since the material which forms the filter element at least partially, in particular at the time of production, is used to form the stabiliser. Furthermore, production costs and in particular material costs can be reduced. In particular, the stabiliser can be distributed particularly homogeneously in the filter element, in particular in a layer of the filter element, and particularly preferably on a surface of the filter element, whereby a uniform or targeted efficacy can be achieved. The term "a precursor" shall be understood in particular to mean a starting material which is provided to form an end product, such as a substance, an element or a unit, preferably by polymerisation, in particular cross-linking, in particular with itself and/or with a further substance, preferably a further precursor. Terms such as first, second or third element, substance, precursor, and/or unit are used in particular merely for identification and/or differentiation and preferably shall not be understood as specifying an order, in particular with regard to production. In particular, the term "the same precursor" shall be understood to mean in particular the same amount of substance of the precursor added once, in particular in a single method step. With regard to the fact that "a precursor forms the filter element at least partially", this shall be understood to mean in particular that the precursor, in particular at the time of production of the filter unit, at least partially influences a shape, a feel, a texture, in particular a porosity, of the filter element and/or a membrane of the filter element and/or forms the same at least partially. The same first precursor is preferably a pore generator of the filter element. The same first precursor is also provided in particular for forming the filter element at least partially, wherein the same first precursor preferably forms, polymerises, in particular cross-links, with itself and/or with at least one further precursor, at least partially. The term "cross-link" shall be understood in particular to mean polymerises, more specifically advantageously polymerises with at least one node point and/or crossing point, preferably at least a plurality of node points and/or crossing points. In particular, the same first precursor is also provided for functionalising the filter element. In particular, a non-cross-linked precursor, in particular a residual non-cross-linked amount of substance of the precursor, is oxidatively cleaved and flushed with water during a production method, in particular during a post treatment.

The cross-linking can be performed in particular at least partially by means of a heterocyclic part of the first precursor and/or an aliphatic chain part of the first precursor. In particular, the first precursor can form the separation structure at least partially, in particular by the cross-linking, wherein the carrier structure is preferably substantially free from the first precursor, in particular by means of a washing out process.

It is also proposed that the stabiliser is provided for taking up a substance, preferably at least a tannin and/or a phenol, which is dissolved in the liquid and the further stabiliser is provided for taking up a further substance, preferably a protein and/or a peptide, which is dissolved in the liquid and which is different from the first substance. A stabilisation of the liquid can be further improved as a result, since different substances can be separated from the liquid in a targeted manner and selectively by means of the different stabilisers.

It is conceivable that the filter device is provided for one-time use, wherein a stabiliser of the filter unit is not regenerable, and thus reduces a service life of the filter device. In order to extend the service life of the filter device, in particular by making it suitable for multiple use, and in particular in order to save material costs, it is preferably proposed that the filter unit has at least one chemically regenerable stabiliser, in particular at least a plurality of, preferably at least two and particularly preferably precisely two chemically regenerable stabilisers, in particular the stabiliser already mentioned and/or the further stabiliser already mentioned. The term "chemically regenerable" shall be understood in particular to mean that the filter unit can be regenerated by a chemical reaction. In particular, the stabiliser, in particular the stabiliser already mentioned, is chemically regenerable by means of an acid and/or a lye, preferably a caustic soda lye. The stabiliser, in particular the further stabiliser already mentioned, is also chemically regenerable by means of a saline solution, preferably a sodium chloride solution.

It is also proposed that the filter unit has at least one stabiliser, in particular the stabiliser already mentioned, which is an adsorbent. A substance dissolved in liquid can hereby also be separated therefrom in a simple way. In particular, the substance in the filter unit accumulates at the interface between solid and liquid phase, where it can be removed particularly advantageously for regeneration of the stabiliser. The term "an adsorbent" shall be understood to mean in particular a stabiliser which preferably uses Van-der-Waals interactions as separation principle and in particular is provided for adsorbing a substance dissolved in the liquid.

It is additionally proposed that the filter unit has at least one stabiliser, in particular the further stabiliser already mentioned, which is an ion exchanger. A substance dissolved in liquid can hereby be separated from the liquid in a particularly simple way. The term "an ion exchanger" shall be understood to mean in particular a stabiliser which preferably uses Coulomb interactions as separation principle and in particular is provided for exchanging ions with a substance dissolved in the liquid, in particular the substance itself. The ion exchanger can advantageously be formed as a cation exchanger and/or anion exchanger.

It is also proposed that the same first precursor is provided for functionalising the filter element hydrophilically. A penetration of the filter element with the liquid transversely to the direction of flow can be improved hereby. An optimal substance exchange during the filtration can be ensured. In particular, a retentate circulation can be improved.

It is also proposed that the same first precursor comprises at least polyvinylpyrrolidone (PVP). The first precursor can also comprise in particular pore generators, more specifically preferably hydrophilic pore generators, such as polyvinyl acetate, polyvinylpyrrolidone, polyethylene glycol, copolymers of vinylpyrrolidone, polyvinyl alcohol, polyethylene glycol, polyethylene glycol ester and/or benzophenone acrylate. An environmental and/or health compatibility can be further improved hereby.

It is also proposed that the filter device comprises at least one second precursor which is provided for forming a stabiliser at least partially, in particular the stabiliser already mentioned. Various properties of the stabiliser can hereby be set, in particular depending on a ratio of concentration of the first precursor to the second precursor. In particular, the second precursor is different from the first precursor. A ratio, in particular a weight and/or volume ratio, of the first precursor to the second precursor is preferably between 80% to 20% and 55% to 45%, preferably between 70% to 30% and 60% to 40%. The ratio is particularly preferably 65% to 35%.

It is additionally proposed that the second precursor comprises at least vinyl acetate (VA). A strength, a loading, and in particular an adsorption behaviour of the stabiliser can thus advantageously be set particularly advantageously. The second precursor preferably forms the filter element at least partially. In particular, the second precursor is cross-linked with the first precursor in one operating state of the filter device. In particular, a mixing ratio of both precursors, preferably of the first and second precursor, can be adjusted in order to set desired properties of the stabiliser.

In one embodiment of the invention it is proposed that the filter device has at least one third precursor which comprises polysulfone (PS), polyethersulfone (PES) and/or polyvinylidene fluoride (PVDF), and which is provided for forming the filter unit at least partially.

The third precursor can also comprise polyether imide, polyimide, polyamide, polyamide imide, polyether, polyether ketone and/or polyether ether ketone. In particular, the second precursor and/or the third precursor can be provided to form the carrier structure of the filter element at least partially, in particular at least to a large extent. In particular, the second precursor and/or the third precursor are/is provided for being cross-linked hydrophilically with the first precursor, in particular by a covalent and/or ionic linking, in particular cross-linking, therewith. In particular, with regard to the production of the filter device, the first precursor, the second precursor and/or the third precursor can be part of a lumen liquid and/or a polymer solution.

The health compatibility can hereby be further improved.

In a preferred embodiment of the invention it is proposed that the filter unit has at least one stabiliser, in particular the stabiliser already mentioned, which is formed at least partially by at least one cross-linked precursor, in particular the same first precursor. The stabiliser can hereby be formed particularly economically. In particular, a stabiliser that is resistant to oxidation and insoluble in a lye can thus be formed. In particular, the first precursor cross-linked with the second precursor forms the stabiliser at least partially, preferably completely.

In particular, the filter device can comprise further precursors in order to assist a cross-linking, for example in particular can comprise hydrophobic pore generators, preferably block copolymers with a hydrophobic component and hydrophilic component, copolymers of vinylpyrrolidone with vinyl acetate (PVP/VA), polyethylene glycol-co-propylene glycol, in particular known under their trade name (Poloxamer 477), copolymers with acrylate and acrylamide groups. Further precursors, in particular cross-linkable polymers, in particular hydrophilic polymers cross-linkable without light irradiation, or oligomers, such as benzophenone methacrylate or polyvinyl alcohol (PVA), are also conceivable.

In a particularly preferred embodiment of the invention it is proposed that the filter unit has at least one stabiliser formed as adsorbent, in particular at least a plurality of, preferably at least two and particularly preferably precisely two stabilisers formed as adsorbent, in particular the stabiliser already mentioned and/or the further stabiliser already mentioned, which comprises at least one cross-linked polyvinylpyrrolidone (PVPP), a xerogel, a silica gel, a zeolite, a bentonite and/or a mixture thereof. Stabilisation can be further improved hereby.

The filter unit can in particular have a stabiliser formed as an ion exchanger, in particular the further stabiliser already mentioned, which comprises at least one functionalised hydrophilic polymer, a functionalised silica gel, a functionalised cellulose, a functionalised dextran. The function of the stabiliser as anion and/or cation exchanger is in particular dependent on the functionalisation. In particular for functionalisation of the stabiliser as an anion exchanger, ammonium groups, in particular quaternary ammonium groups, diethylaminoethyl (DEAE), trimethylhydroxypropyl, quaternary aminoethyl (QAE), quaternary aminomethyl (QAM), triethylaminoethyl (TEAM), triethylaminopropyl (TEAP) and polyethyleneimine (PEI) can be used as an anionic exchanger. In particular for functionalisation of the stabiliser as a cation exchanger, carboxyl groups, sulfate groups, in particular sulfonate (S), sulfoethyl (SE), sulfopropyl (SP), phosphate groups, in particular orthophosphate (P), methacrylate and/or carboxylmethyl (CM) can be used. In order to further improve an environmental and/or health compatibility, it is proposed that the filter unit has a stabiliser which is formed as an ion exchanger and which comprises at least one functionalised agarose. In particular, the agarose is formed as a cross-linked agarose, more specifically in particular as sepharose, preferably sepharose pellets, in particular also known as sepharose beads. The agarose is particularly preferably functionalised by means of an ammonium group, preferably a quaternary ammonium group, and particularly preferably diethylaminoethyl (DEAE). The further stabiliser is preferably formed as an anion exchanger.

The invention also proceeds from a method for producing a filter device which is provided for stabilising a liquid, in particular beverages, and has a filter unit, wherein a filter element of the filter unit is formed at least partially at least by a first precursor.

It is proposed that an integrated stabiliser of the filter unit is formed at least partially by the same first precursor. A stabilisation of liquids can be improved hereby. The stabiliser can also be integrated efficiently, and production costs and in particular material costs can be reduced. In particular, the first precursor, preferably a substance quantity of the precursor, is dissolved in a solvent in one method step, preferably together with further substances, or further precursors, which in particular are provided for forming the filter unit.

The solvent can comprise in particular N-methylpyrrolidone (NMP), dimethylsulfoxide, chloroform, methylene chloride, dimethylformamide and/or dimethylacetamide.

It is also proposed that the filter unit is formed at least partially by a further stabiliser and/or at least a fourth precursor, in particular of the further stabiliser. A filter unit having a plurality of stabilisers can hereby be formed in a simple way.

In particular, the filter unit is formed by means of phase inversion, and the filter unit is formed by means of the first precursor and in particular by means of the further substance, in particular a further precursor. Furthermore, an activator is proposed by means of which a forming of at least one stabiliser at least by the same first precursor is initiated. The stabiliser can hereby be formed in a targeted manner. The term "an activator" shall be understood to mean in particular a substance which is provided for reacting in a cross-linking manner with at least one substance, in particular the same first precursor, preferably by irradiation with light, in particular UV light. The activator can be in particular a radical starter, such as peroxide, tert-butylperoxypivalate and/or $H_2O_2/CuCl_2$. The activator can also be in particular a photoactivator, such as 4,4'-diazidostilbene 2,2'-disodium sulfonate.

The photoactivator can also be 2,4-diethyl-9H-thioxanthen-9-one and/or phenylbis(2,3,6-trimethylbenzoyl)phosphine oxide.

In particular, at the time of production of the filter device, light can be irradiated within and/or directly after a spinning nozzle, for example by means of a light guide arranged in the spinning nozzle. A targeted irradiation of an inner surface of the filter element, in particular the separation structure, can advantageously be provided. Furthermore, when producing the filter element at least one production parameter, in particular a plurality of production parameters, such as a temperature, a pH value, a concentration of the activator, in particular of the radical starter and/or of the photoactivator, and an intensity and/or wavelength of light irradiation can be varied and controlled in particular by means of an open-loop and/or closed-loop control unit. In particular, a temperature during production can be at least 20° C., preferably at least 50° C., and particularly preferably at least 70° C. and/or at most 130° C., preferably at most 100° C. and particularly preferably at most 90° C.

In particular in order to protect the filter element against radicals and/or light radiation, the filter element can be provided with a reflection and/or absorption layer, for example by means of light-absorbing substances, such as carbon black and/or radical catchers, for example by means of dialkyldithiocarbamates. Alternatively or additionally to irradiation with light, irradiation with ionising radiation is also conceivable.

It is also proposed that the stabiliser is formed by reactive spinning, wherein the same first precursor is radically polymerised.

The invention also proceeds from a method with a filter device which is provided for stabilising a liquid, in particular beverages, with a filter unit, wherein the filter unit in one method step stabilises a liquid by means of at least one integrated stabiliser of the filter unit and in a further method step the integrated stabiliser is regenerated. Continuous operation with regenerable stabilisers can be achieved hereby.

DRAWINGS

Further advantages will become clear from the following description of the drawings. The drawings show an exemplary embodiment of the invention. The drawings, the description, and the claims contain numerous features in combination. A person skilled in the art will also suitably consider the features individually and combine them to form expedient further combinations.

Figure 2:
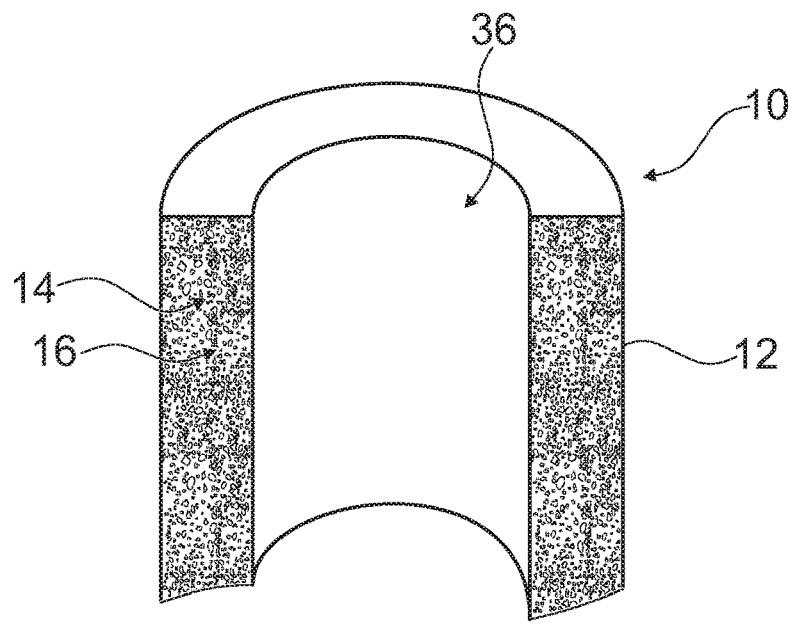
Figure 3:
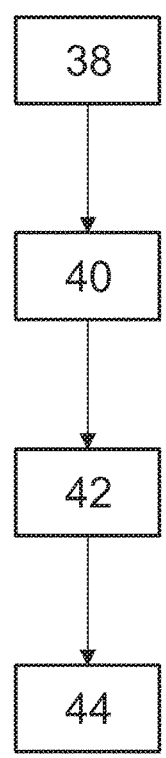
Figure 4:
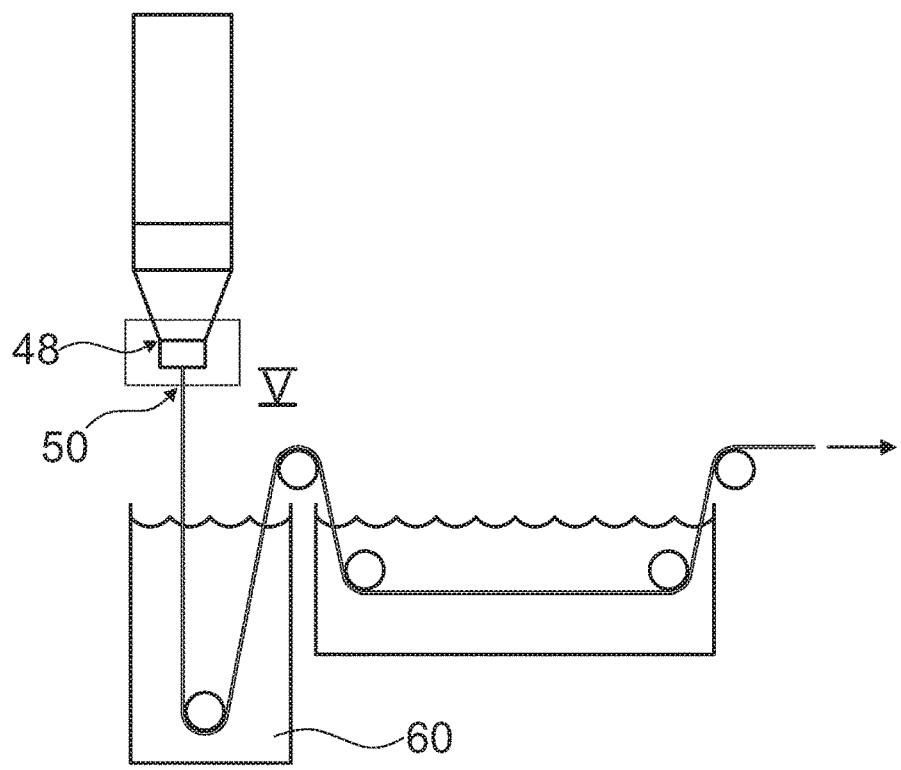
Figure 5:
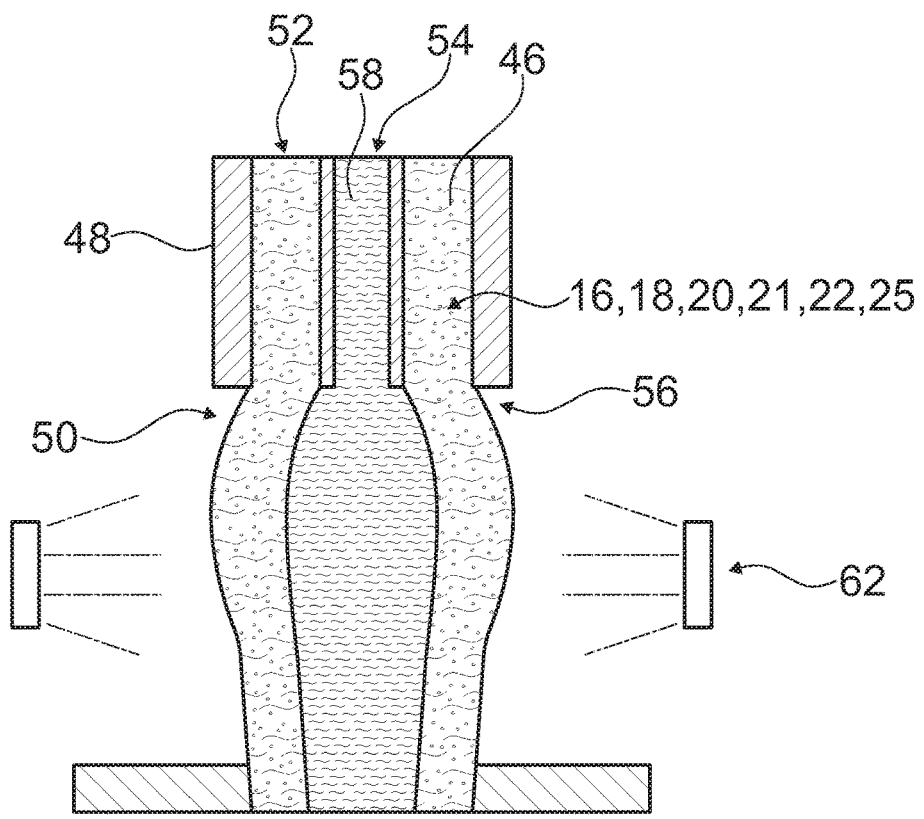
Figure 6:
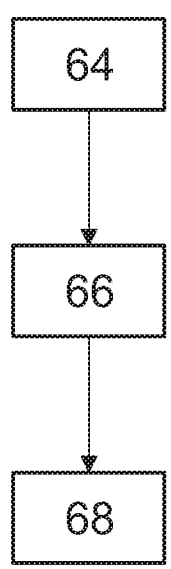

In the drawings:

FIG. 1 shows a filter module with a filter device with a plurality of filter units in an exploded view, FIG. 2 shows one of the filter units in a sectional view, FIG. 3 shows a schematic process sequence for producing the filter unit, FIG. 4 shows a device for producing the filter device, FIG. 5 shows a device for producing the filter device with a spinning nozzle, and FIG. 6 shows a schematic process sequence for regenerating stabilisers.

DESCRIPTION OF THE EXEMPLARY EMBODIMENT

FIG. 1 shows a filter module 24 having a filter device. The filter device is provided for stabilising a liquid. In the present case the filter device is provided for stabilising beverages, such as drinking water, juices, and liquor, in particular beer, wine and/or whisky. The filter device, however, can also be used for stabilising other liquids. The filter device stabilises the liquids in that it separates from the liquid, in at least one operating state, organic substances dissolved in the liquid, such as tannins, phenols, proteins and/or peptides and/or other substances that cause turbidity.

The filter device has a housing 26. The housing 26 has a housing main body 28. The housing 26 also has two end caps 30, 32. The end caps 30, 32 seal the housing main body 28 in a liquid-tight manner. A first end cap 30 has a liquid inlet. A second end cap 32 has a liquid outlet. The housing main body 28 forms a cylindrical casing. The housing main body 28 delimits a cavity 34. The end caps each have two connectors. In each case one connector is used for connection to a liquid circuit of the liquid that is to be stabilised. Each further connector is used to deliver the stabilised liquid.

The filter device has at least one filter unit 10 (see FIG. 2). In the present case the filter device has a plurality of filter units 10. The filter units 10 are arranged in the cavity 34. For better clarity, just one of the filter units has been provided with a reference sign. The filter units 10 are arranged and bundled parallel to one another. The filter units 10 are provided with a seal in end regions which are arranged at least partially in the end cap in an assembled state. The seal, in an assembled state, seals a gap between end cap and the filter units. Mixing of a liquid that is to be stabilised with a liquid that has already been stabilised is hereby avoided. The seal is formed by a resin, in particular a potting resin. The filter units 10 are formed in particular at least substantially equivalently to one another, in particular apart from manufacturing and/or assembly tolerances. Hereinafter, just one filter unit 10 will thus be described in greater detail. In the present case the filter unit 10 is formed as a membrane filter unit. The filter unit 10 has a liquid channel 36 for guiding the liquid.

The filter unit 10 has a filter element 12. The filter element 12 forms a membrane. The filter element 12 has a porous structure partially permeable for the liquid. The porous structure forms the membrane at least partially. The filter element 12 delimits the liquid channel 36 in at least one direction. The filter element 12 delimits the liquid channel 36 in a peripheral direction of the liquid channel 36.

The filter unit 10 is formed as a hollow fibre. The filter unit 10 has a casing. The casing is formed by the filter element 12. The filter unit 10 is formed as a cross-flow filtration unit. The liquid channel 36 runs along the filter element 12. A liquid running in the liquid channel 36 in an operating state passes through the filter element 12 transversely to the liquid channel 36. The filter unit is formed at least partially from polysulfone, polyether sulfone or polyvinylidene fluoride.

In particular, the filter unit 10 can be formed as a capillary membrane. The filter unit can have in particular an outer diameter of at most 10 mm, preferably at most 5 mm, and particularly preferably of at most 3 mm and/or of at most 0.1 mm, preferably of at most 0.3 mm, and particularly preferably of at least 0.5 mm. Alternatively, the filter unit 10 can be formed as a flat membrane.

The filter device has a first precursor 18. The first precursor 18 comprises at least polyvinylpyrrolidone. The first precursor 18 is polyvinylpyrrolidone in the present case. The first precursor 18 is provided for forming the filter element 12 at least partially. The same first precursor 18 is a pore generator of the filter element 12. The same first precursor 18 is also provided for functionalising the filter element 12. The same first precursor 18 is provided for functionalising the filter element 12 hydrophilically. The same first precursor 18 is also provided for forming the stabiliser 14 at least partially.

The filter device also has at least one second precursor 20. The second precursor 20 forms the filter element 12 at least partially. The second precursor 20 is provided for forming the stabiliser 14 at least partially. The second precursor 20 comprises at least vinyl acetate. In the present case the further precursor 20 is vinyl acetate.

The first precursor 18 is provided for polymerising and in particular for cross-linking with itself and/or with at least the second precursor 20. A ratio, in particular a weight and/or volume ratio, of the first precursor 18 and of the second precursor 20 is 65% to 35%.

The filter device also comprises at least one third precursor 21. The third precursor 21 comprises polysulfone (PS), polyethersulfone (PES) and/or polyvinylidene fluoride (PVDF). In the present case the third precursor is polyether sulfone. The third precursor 21 is provided for forming the filter unit 12 at least partially.

The filter unit 10 also has at least one integrated stabiliser 14. The stabiliser 14 is formed at least partially in one piece with the filter unit 10. The stabiliser 14 is formed in one piece with the filter element 12.

The stabiliser 14 is provided for selectively separating from the liquid and in particular taking up at least one substance dissolved in the liquid. The substance separated from the liquid by the stabiliser 14 is a tannin and/or a phenol.

The stabiliser 14 is chemically regenerable. The stabiliser 14 is chemically regenerable by means of a lye. The lye is a caustic soda lye. However, it is also conceivable that the stabiliser 14 is chemically regenerable by means of another lye and in particular by means of an acid.

The stabiliser 14 is an adsorbent. The stabiliser 14 comprises a cross-linked polyvinylpyrrolidone. Alternatively or additionally, however, the filter unit 10 could also have a stabiliser 14 which is an adsorbent which comprises a xerogel, a silica gel, a zeolite, a bentonite and/or a mixture thereof.

The filter unit 10 also has at least one further integrated stabiliser 16. The stabiliser 14 and the further stabiliser 16 are different from one another. The further stabiliser 16 is provided for selectively separating from the liquid and in particular taking up at least one substance dissolved in the liquid. The substance separated from the liquid by the further stabiliser 16 is a protein and/or a peptide.

The further stabiliser 16 is chemically regenerable. The further stabiliser 16 is chemically regenerable by means of a saline solution, preferably a sodium chloride solution.

The stabiliser 14 and the further stabiliser 16 differ from one another by a separation principle. The further stabiliser 16 is an ion exchanger. The further stabiliser 16 is formed as an anion exchanger. It is also conceivable, however, that the further stabiliser 16 can be formed as a cation exchanger.

The stabiliser 14 and the further stabiliser 16 differ from one another by a substance, in particular a fourth precursor 22, from which the stabilisers 14, 16 are formed. The further stabiliser 16 comprises a functionalised agarose. The agarose is a cross-linked agaraose. The agarose also forms sepharose beads. Additionally or alternatively, the further stabiliser 16 could comprise a functionalised hydrophilic polymer, a functionalised silica gel, a functionalised cellulose, and a functionalised dextran. The agarose in the present case is functionalised by means of an ammonium group, preferably a quaternary ammonium group and particularly preferably diethylaminoethyl (DEAE). The further stabiliser 16 is formed as an anion exchanger. In particular the further stabiliser 16 can be formed preferably also as a cation exchanger depending on a functionalisation. For functionalisation of the further stabiliser 16 as an anion exchanger, ammonium groups in particular, in particular quaternary ammonium groups, diethylaminoethyl (DEAE), trimethylhydroxypropyl, quaternary aminoethyl (QAE), quaternary aminomethyl (QAM), triethylaminoethyl (TEAM), triethylaminopropyl (TEAP) and polyethyleneimine (PEI), are used. In particular for functionalisation of the further stabiliser 16 as a cation exchanger, carboxyl groups, sulphate groups, in particular sulfonate (S), sulfoethyl (SE), sulfopropyl (SP), phosphate groups, in particular orthophosphate (P), methacrylate and/or carboxymethyl (CM) can be used.

FIG. 3 schematically shows a method for producing the filter device. FIGS. 4 and 5 schematically show an associated device for producing the filter device. In a method step 38, a polymer solution 46, in particular a polymer suspension, is produced in a method step 38. At least one precursor is dissolved in a suitable solvent, in particular a solvent mixture. In the present case the first precursor 18 is dissolved in the solvent. The second precursor 20 is also dissolved in the solvent. The third precursor 21 is also dissolved in the solvent. Furthermore, the further stabiliser 16 is added in particulate form to the solution and in particular is dissolved. It is also conceivable, however, that a fourth precursor 22 which is provided for forming the further stabiliser 16 is dissolved in the solvent. A polymer solution 46 is formed which in particular has the further stabiliser 16 in particulate form.

In a further method step 40 a spinning solution jet 50 is spun from the polymer solution 46 by means of a spinning nozzle 48. The spinning nozzle 48 has two channels 52, 54 separated from one another. The channels 52, 54 open out jointly to an outlet opening 56 of the spinning nozzle 48. The polymer solution 46 is pumped in an outer channel 52 of the spinning nozzle 48. A lumen liquid 58 is pumped in an inner channel 54 of the spinning nozzle 48. The lumen liquid 58 is a liquid in which the used components for production of the filter unit 10 are not soluble. In the present case, water for example can be used as lumen liquid 58. A spinning solution jet 50 which forms the filter unit 10 by at least a post-treatment is formed. Here, the lumen liquid 58 forms the liquid channel 38 of the filter unit 10.

Alternatively or additionally, the lumen liquid 58 can comprise water-based solvents, in particular organic solvents. The polymer solution 48 and the lumen liquid 58 are then usually separated from one another by phase inversion in a precipitation bath 60, and the filter unit 10 is thus formed. In the present case, however, the filter unit is additionally formed in a further method step 42 by reactive spinning. To this end, an activator 25 is added prior to the spinning into a polymer solution 46. The activator 25 is provided for initiating radical polymerisation. The activator 25 can be in particular a radical starter, such as peroxide, tert-butyl peroxypivalate. In the present case the activator 25 is a photoactivator, such as 4,4,'-diazidostilbene 2,2'-disodium sulfonate. The photoactivator is activated by irradiation with light, in particular UV light. To this end, a light source 62 can be used which is directly integrated into the spinning nozzle, in particular by means of a light guide. In the present case the light source 62 is a UV lamp. Due to the radical polymerisation, the first precursor 18 not only forms the filter element 12, but at the same time forms the stabiliser 14 by cross-linking with the second and in particular the third precursor 20, 21. In this method the stabiliser 14 is at the same time formed at least partially and the filter element 12 is formed from the same first precursor 18. The filter unit 10 is furthermore also formed at least partially as a result.

It is conceivable that a light guide with a ground tip can be provided in order to improve irradiation homogeneity. Alternatively to an embodiment of the light source as a UV lamp, embodiments as an LED, as a gas discharge lamp, in particular a deuterium lamp, as a vapour lamp, as a laser and/or as a gas discharge lamp, in particular a fluorescent tube, are possible. The light source preferably has a radiation spectrum and preferably an intensity maximum of the radiation spectrum with a wavelength of at most 390 nm, advantageously of at most 315 nm, more advantageously of at most 280 nm, preferably of at most 200 nm, and particularly preferably of at most 121 nm, and/or in particular of at least 10 nm, advantageously of at least 100 nm, more advantageously of at least 200 nm, preferably of at least 280 nm, and particularly preferably of at least 315 nm.

In particular for the case in which the filter unit 10 is formed as a flat membrane, the spinning solution jet 50 can be extruded on a support material which in particular has large pores or transferred to a roller for introduction into the precipitation bath 60.

In a further method step the polymer solution 46 and the lumen liquid 58 are separated from one another by phase inversion in the precipitation bath 60.

A further method step is also conceivable, in which a non-cross-linked proportion of the first precursor is removed from the filter element 12. To this end, the filter element 12 can be cleaved in particular oxidatively, preferably by means of sodium chloride or hydrogen peroxide, and in particular can be rinsed with water.

FIG. 6 schematically shows a process sequence with a filter device. To this end, a liquid is stabilised by means of the stabilisers 14, 16 of the filter units 10 in a method step 64. If the stabilisers 14, 16 lose their effect, the filter units 10 then have to be replaced for new filter units in the case in which the stabilisers 14, 16 are not regenerable. In the present case, the stabilisers 14, 16 are regenerable. In a further method step 66, for regeneration the filter units 10 are added to a saline solution, a lye and/or an acid, in particular depending on the stabilisers 14, 16. In a further method step the regenerated stabilisers 14, 16 can be used again to stabilise the liquid. In order to enable a continuous stabilisation of the liquid, a part of the filter unit 10 is used for stabilisation of the liquid, whereas at the same time a further part of the filter unit 10 is regenerated. Here, method steps 64, 66, 68 are performed simultaneously in part.

The invention claimed is:

1. A method for producing a filter device for stabilising a liquid, the filter device having at least one filter unit, the at least one filter unit comprising an integrated stabiliser and at least one filter element,
   the method including forming the at least one filter element by reactive spinning of a first precursor, and a third precursor; and optionally a second precursor, in a reactive spinning step;
   wherein the integrated stabiliser of the at least one filter unit is formed during the reactive spinning step by radically polymerizing the first precursor in the presence of an activator;
   wherein the first precursor comprises polyvinylpyrrolidone, and the third precursor comprises polysulfone, polyether sulfone and/or polyvinylidene fluoride.

2. The method of claim 1, including providing the at least one filter unit as a membrane unit comprising a hollow fiber membrane.

3. The method of claim 1, including hydrophilically functionalizing the at least one filter element by the first precursor.

4. The method of claim 1, wherein the second precursor comprises vinylacetate.

5. The method of claim 1, including at least partially forming the integrated stabiliser or a further integrated stabiliser by the second precursor.

6. The method of claim 1, including at least partially forming the at least one filter element by a cross-linked precursor.

7. The method of claim 1, including at least partially forming the integrated stabiliser by a cross-linked precursor.

8. The method of claim 1, wherein the integrated stabiliser is an adsorbent.

9. The method of any one of claim 1, wherein the integrated stabiliser comprises an ion exchanger.

* * * * *